United States Patent
Venturini et al.

(10) Patent No.: US 8,567,762 B2
(45) Date of Patent: Oct. 29, 2013

(54) ELECTRO-MECHANICAL LIFTING DEVICE

(76) Inventors: Sandro Venturini, Rome (IT); Cristian Isopo, Pomezia (IT)

( * ) Notice: Subject to any disclaimer, the term of this patent is extended or adjusted under 35 U.S.C. 154(b) by 1236 days.

(21) Appl. No.: 12/224,917

(22) PCT Filed: Mar. 30, 2007

(86) PCT No.: PCT/IT2007/000245
§ 371 (c)(1),
(2), (4) Date: Dec. 18, 2008

(87) PCT Pub. No.: WO2007/113891
PCT Pub. Date: Oct. 11, 2007

(65) Prior Publication Data
US 2010/0219386 A1 Sep. 2, 2010

(30) Foreign Application Priority Data
Mar. 31, 2006 (IT) .............................. RM2006A0180

(51) Int. Cl.
*B66F 3/10* (2006.01)
*B66F 3/44* (2006.01)

(52) U.S. Cl.
USPC ..................................... 254/102; 254/DIG. 2

(58) Field of Classification Search
USPC ............... 254/102, 93 R, 2 R, DIG. 2; 280/6; 74/625; 192/66.1, 99 R, 99 A, 99 S
See application file for complete search history.

(56) References Cited

U.S. PATENT DOCUMENTS

| 2,596,462 | A | * | 5/1952 | Ball | 254/93 R |
| 3,189,322 | A | * | 6/1965 | Hadek | 254/425 |
| 3,595,525 | A | * | 7/1971 | Yaste | 254/2 B |
| 3,829,063 | A | * | 8/1974 | Holzworth | 254/2 R |

(Continued)

FOREIGN PATENT DOCUMENTS

DE  85 15 755 U1  11/1985
EP  1 334 947 A2  8/2003

(Continued)

OTHER PUBLICATIONS

U.S. Department of Labor, Occupational Safety & Health Administration (OSHA), Office of Training and Education, May 1996. "Hazardous (Classified) Locations". pp. 1 through 6. (Specifically highlighted areas on p. 1 and 4 of attached document) http://www.osha.gov/doc/outreachtraining/htmlfiles/hazloc.html.*

(Continued)

*Primary Examiner* — Joseph J Hail
*Assistant Examiner* — Marc Carlson
(74) *Attorney, Agent, or Firm* — Hedman & Costigan, P.C.; James V. Costigan; Kathleen A. Costigan (57) ABSTRACT

The invention relates to an electro-mechanical lifting device comprising a lifting head and a controlling and positioning carriage, said lifting head comprising a substantially vertical telescopic cylinder element, comprised of a plurality of outer telescopic jacket elements and a corresponding number of inner telescopic threaded elements, an element for coupling the member to be lifted being provided above the upper jacket element, the upper element of the lower inner threaded element being coupled with said lifting member coupling element, the intermediate threaded element(s) being provided with an outer and an inner threading, while the lower inner threaded element is threaded only on the outer surface, coupling between said jacket elements providing means preventing their rotation each other.

20 Claims, 12 Drawing Sheets

(56) References Cited

U.S. PATENT DOCUMENTS

| | | | | |
|---|---|---|---|---|
| 3,881,692 A | * | 5/1975 | Clarke | 254/101 |
| 3,982,767 A | * | 9/1976 | Larsson et al. | 280/43.12 |
| 4,015,825 A | * | 4/1977 | Graafsma et al. | 254/101 |
| 4,223,856 A | * | 9/1980 | DiVincenzo | 244/50 |
| 4,287,959 A | * | 9/1981 | Inman | 180/12 |
| 4,609,179 A | * | 9/1986 | Chern et al. | 254/102 |
| 4,650,324 A | * | 3/1987 | Underberg | 356/149 |
| 4,692,084 A | * | 9/1987 | Persson | 414/607 |
| 4,721,429 A | * | 1/1988 | Fujita et al. | 414/458 |
| 4,943,034 A | * | 7/1990 | Wagnon | 254/122 |
| 5,123,629 A | * | 6/1992 | Takeuchi | 254/103 |
| 6,685,169 B2 | * | 2/2004 | Shim | 254/103 |
| 6,871,412 B2 | * | 3/2005 | Markeson | 33/358 |
| 6,880,416 B2 | * | 4/2005 | Koch | 74/89.35 |
| 6,923,599 B2 | * | 8/2005 | Kelso | 405/230 |
| 7,207,548 B1 | * | 4/2007 | Howe | 254/98 |
| 7,219,378 B2 | * | 5/2007 | Polevoy et al. | 5/200.1 |
| 7,225,694 B2 | * | 6/2007 | Said | 74/89.35 |
| 7,262,530 B2 | * | 8/2007 | Becker et al. | 310/89 |
| 7,267,345 B2 | * | 9/2007 | Maggiori | 280/6.153 |
| 7,331,425 B2 | * | 2/2008 | Bukowski et al. | 187/269 |
| 7,812,492 B2 | * | 10/2010 | Torres et al. | 310/89 |
| 8,051,545 B2 | * | 11/2011 | Peveler | 29/428 |
| 2007/0159018 A1 | * | 7/2007 | Martin et al. | 310/88 |
| 2007/0214902 A1 | * | 9/2007 | Wang | 74/89.26 |
| 2008/0251325 A1 | * | 10/2008 | Bukowski et al. | 187/211 |
| 2010/0096606 A1 | * | 4/2010 | Lee | 254/10 C |
| 2011/0031830 A1 | * | 2/2011 | Oleson et al. | 310/88 |
| 2011/0073822 A1 | * | 3/2011 | Chen et al. | 254/93 R |
| 2011/0082655 A1 | * | 4/2011 | Todd et al. | 702/63 |
| 2011/0084245 A1 | * | 4/2011 | Penenburgh | 254/2 R |

FOREIGN PATENT DOCUMENTS

| | | | |
|---|---|---|---|
| GB | 307 859 A | | 3/1929 |
| GB | 307859 | * | 3/1929 |
| GB | 2387372 A | * | 10/2003 |

OTHER PUBLICATIONS

EP Search Report dated Dec. 2, 2008.

* cited by examiner

ELECTRO-MECHANICAL LIFTING DEVICE

The present invention relates to an electro-mechanical lifting device.

More specifically, the invention relates to a device of the above kind, particularly studied and realised for permitting self-levelling lifting of, e.g. aircrafts and helicopters, trucks, trains, watercrafts, movable bridges, movable control towers, radars, telescopic poles, movable platforms, lifting carriages, industrial working machines, agricultural work machines, missile launch platforms and space shuttles, stabilisers for any kind of vehicle, campers, ecc.

The device according to the invention can also lift motor cradles, support system for assembling aircrafts, ships, helicopters, building platforms, lifting devices for buildings, ecc.

Further, the device according to the invention is also suitable for lifting aircrafts on floating platforms, or aircraft carriers.

The solution suggested according to the present invention permits in synchronism self-levelling of one or of a plurality of lifting devices, to complete a lifting operation.

In the following the specification will be addressed to the use of the device for lifting aircrafts and helicopters, and particularly for every lifting operation for centering weighting and maintenance, but it is well evident that invention must not be considered limited to this specific use.

As it is well known, at present lifting systems for aircrafts and helicopters are of the hydraulic, oleo-pneumatic or electro-hydraulic or manual type, and those developed recently are semiautomatic, or lifting systems actuated by operators through control units.

It is also known that for this lifting operation they are presently used at least 3-5 persons for each operation, and to level an aircraft or helicopter, an instrument is used known as plumb line.

This operation is realised by an optic control provided in each aircraft in a place set by the manufacturer.

It is still known that, in order to carry out the lifting operation, presently systems are employed not permitting a lifting operation compensating the angle between aircraft on the dampening elements during the lifting operation.

Further, in the known solutions, manual self-levelling systems are provided, controlled by the operator on the basis of a liquid level check.

By the solution according to the present invention, levelling operation during the lifting and lowering phases is carried out with the help of an electronic level suitably studied for every specific needing, interacting with the managing card provided inside a lifting device known as master, interfaced with all the other lifting systems acting for the aircraft levelling, perfectly working together with the aid of a single operator form a perfectly safe position far from aircraft or helicopter, carrying out the lifting, weighting and centering operation in a lower time than that required until now. Levelling operation, i.e. continuous monitoring of the position of the aircraft to be lifted is automatically made among level, managing card and perfect synchrony of lifting without the aid of the operator, i.e. attitude of aircraft in the x-y zero degrees position, and thus in a perfect self-levelling position, permitting weight balancing operation, calculation of displacement arms, as well as single weighting operation on a point or of the whole structure in an automatic mode.

Handling system inside the master device receives and processes signals sent to the electronic level, that can be of the oscillating needle type or of the laser reading type and eventually sending operation signals to the lifting devices in order to carry out the lifting and lowering operation.

Main object of the present invention is therefore that of suggesting a fully automatic lifting device permitting a precise and safe, irreversible, micrometric lifting, provided with all the safety requirements, and with a manual release system for lowering the device in case of failure of the electronic control, the inventive device being further universal, and can be integrated in every known hydraulic lifting device.

A further object of the invention is that of permitting that lifting operations are carried out quickly and with precision and that the operator is in a perfectly safe position.

Still another object of the present invention is that of permitting replacement of the different existing lifting elements.

These and other results are obtained according to the present invention by the use of an electro-mechanical lifting device with a telescopic screw, suitably dimensioned for the specific use and employing the preferred and most suitable material.

It is therefore specific object of the present invention an electro-mechanical lifting device comprising a lifting head and a controlling and positioning carriage, said lifting head comprising a substantially vertical telescopic cylinder element, comprised of a plurality of outer telescopic jacket elements and a corresponding number of inner telescopic threaded elements, an element for coupling the member to be lifted being provided above the upper jacket element, the upper element of the lower inner threaded element being coupled with said lifting member coupling element, the intermediate threaded element(s) being provided with an outer and an inner threading, while the lower inner threaded element is threaded only on the outer surface, coupling between said jacket elements providing means preventing their rotation each other.

In a first embodiment of the device according to the invention, said carriage is fixedly coupled with said lifting head.

In a second embodiment of the device according to the invention, said carriage is removably coupled with said lifting head.

Furthermore, according to the invention, said carriage can provide an electric motor, a ratiomotor and gears for transmitting the motion.

Always according to the invention, transmission of lifting motion to said head can be along a horizontal axis or along a vertical axis.

Still according to the invention, a compensation plate can be provided under said lifting head, for compensating movements along the plane during the lifting.

Particularly, said plate can be comprised of three different juxtaposed elements, provided with dove tail couplings, permitting their sliding according to axis x, y along the resting plane, within the dove tail slots being provided springs that, by brackets and screws, are anchored to said plate, said screws further acting as coupling of said plate elements, said spring ensuring centering of the upper element and of the lower element with respect to the central element, so that they can translate longitudinally and transversely.

In a further embodiment of the device according to the invention, coupling between said coupling element of the member to be lifted and said upper end of the lower inner threaded element is realised by means permitting inclination of said coupling element of the member to be lifted.

Particularly, according to the invention, said coupling element of the member to be lifted is comprised of a cap, coupled at the upper end of said inner lower threaded element by springs, said cap being housed within a groove realised in said upper end of the lower inner threaded element.

Furthermore, according to the invention, load cells are provided in said lifting head.

According to the invention, said device can be provided with failure nomenclature system, with GPS system, GSM monitoring system and automatic system for handling programmed maintenance.

Furthermore, according to the invention, said lifting device can be integrated with xenon light or with another type of light, provided with light system permitting night working, laser aim system in order to perfectly centering the position under the member to be lifted.

Further, according to the invention, said device can be realised with a drive wheel, or on a motorised carriage, comprising electric tracks and special wheels.

Finally, device according to the invention can be provided with explosion-proof motors.

Interfacing between lifting devices and level can be realised by cable, blue tooth, and radio frequency.

The present invention will be now described, for illustrative but not limitative purposes, according to its preferred embodiments, with particular reference to the figures of the enclosed drawings, wherein.

Figure 1:
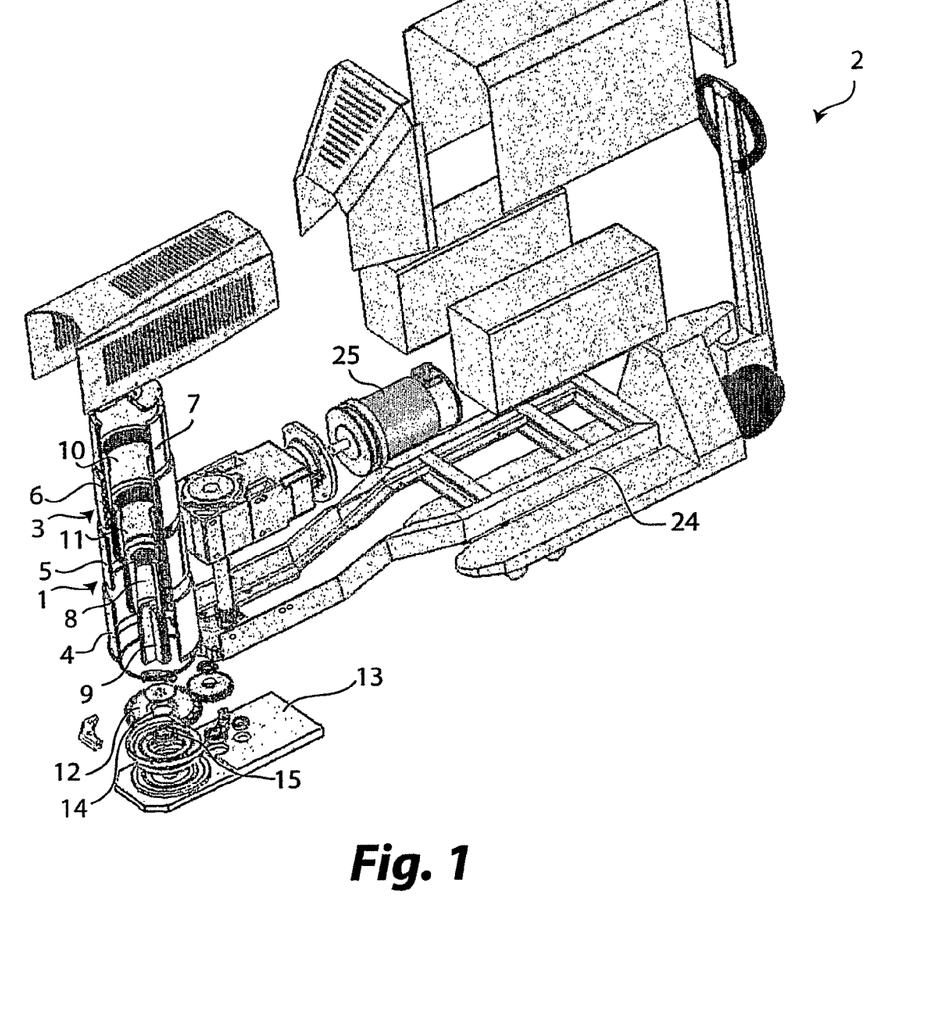
FIG. 1 is a perspective exploded view of a first embodiment of an electro-mechanical lifting device according to the invention.
Figure 2:
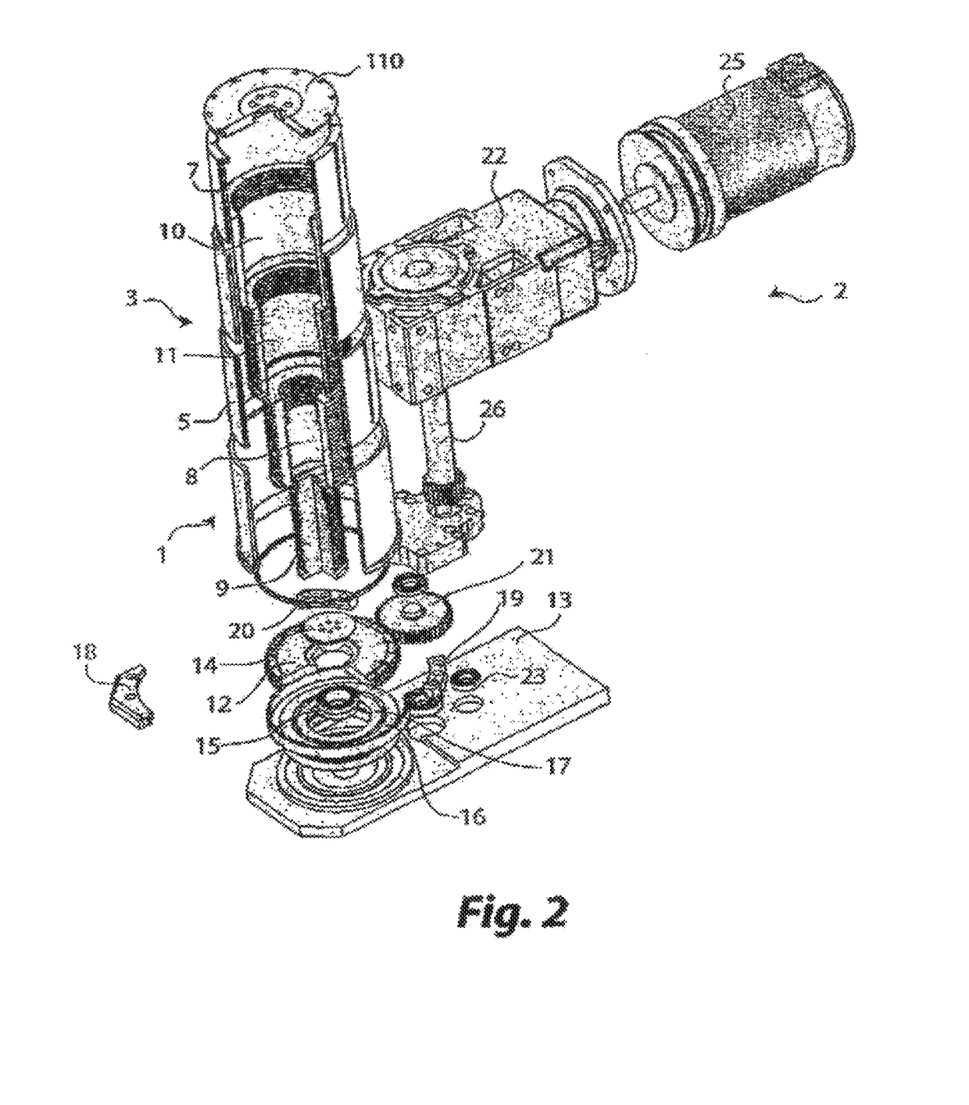
FIG. 2 is a perspective exploded view of a particular of the electro-mechanical lifting device according to FIG. 1.

Observing first FIGS. 1 and 2 of the enclosed drawings, it is shown a first embodiment of an electro-mechanical device according to the invention, comprised of a lifting head, generically indicated by reference number 1, and a control and motion carriage, generically indicated by reference number 2.

Device 1 according to the invention has been designed for permitting lifting very heavy members.

Lifting element is comprised of a telescopic cylinder, generically indicated by reference number 3, comprised of a screw—nut screw system, electrically actuated by a battery supplied motor, the structure of which will be described in greater detail in the following. Device 1 can be maneuvered by wheeled support or carriage 2.

Device 1 according to the invention provides a telescopic cylinder 3, comprised of four steel outer jackets 4, 5, 6, 7, within which a telescopic screw is housed, said screw being comprised of four threaded sectors 8, 9, 10, 11.

Gear 12, integral with cylinder 3, is housed within the base support 13 by a dowel 14 and a bearing 15. fifth wheels 16, 17 are housed on the support base 13, sustaining the axial loading.

Outer jacket 4 is anchored to the base support 13 by plates 18, 19, 20.

Gear 12 meshes with an idle gear 21, receiving the motion from the ratiomotor 22 shaft, coupled with the base support or plate 13 by a bearing 23 and a iron frame 24. ratiomotor 22 is powered by electric motor 24.

Device 1 according to the invention has, in the first mode, jackets 5, 6, 7 and screws 8, 9, 10, 11 within the outer jacket 4.

Device is positioned in such a way that cap 110 is under the member or load to be lifted. Power is transmitted to the ratiomotor 22 which actuates electric motor 25, said ratiomotor, passing through the shaft 26, transmits the motion to the idle gear 21, making gear 12 rotate at the base of the telescope lifting Cylinder 3, integral with gear 12, starts rotating, making cylinder 11, 8 and screw 9 rotate. The rotation of jackets 5, 6, 7, one with respect to the other, is prevented by longitudinal keys. Cap 110, fixed to jacket 7, prevents rotation of screw 9 causing advancement of the same screw 9 with respect to the cylinder 8, thus causing withdrawal of the jacket 7 when screw 9 reaches the end of the nut screw stroke, by the partial shoulder created by the inner threading of nut screw 8 which starts advancement with respect to cylinder 11, causing withdrawal of jacket 6.

Similarly, exploiting shoulders obtained within cylinders 9, 10, withdrawal of jacket 5 is obtained, bringing the telescopic cylinder 2 at its maximum extension.

A suitable maintenance and lubrication of moving members ensures good operation of the device.

Figures 3, 4:
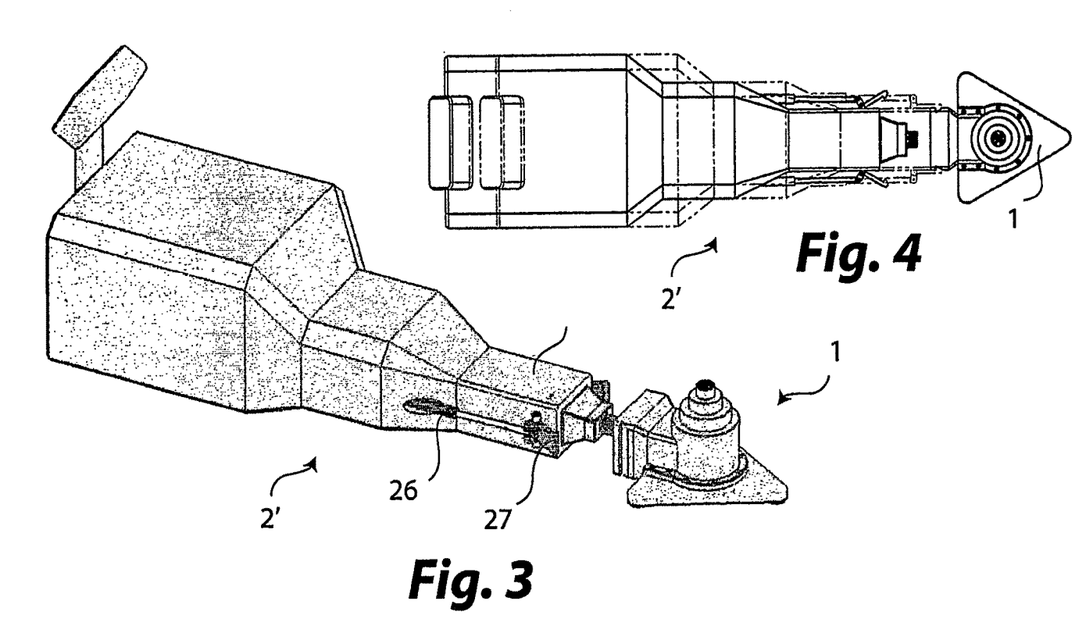
FIG. 3 is a perspective exploded view of a second embodiment of an electro-mechanical lifting device according to the invention.
FIG. 4 is a top view of the electro-mechanical lifting device according to FIG. 3.

Observing now specifically FIGS. 3, 4, it is shown a second embodiment of the device according to the invention, particularly useful for a small device.

In this case too it provides a lifting head 1, the features of which are substantially the same of the previous embodiment, and that therefore will be not further described in the following, and a carriage 2'.

Substantial difference with respect to the previous embodiment is that carriage 2' can be coupled and uncoupled from head 1. Transmission of motion occurs in this embodiment along a vertical axis.

Carriage 2' provided motor 25 and ratiomotor 22, and is coupled with head 1 by a tapered cavity permitting perfect centering, so that transmission shaft can properly mesh with the head, thus transferring the motion.

Actuator transfers motion by stem 26 to hooks 27, said hooks opening and closing, coupling with head 1, for its motion.

In this way, only one carriage 2' can be used for installing different kinds of head 1.

Further, centering between carriage 2' and heads 1 can be assisted using laser reading points.

Figure 5:
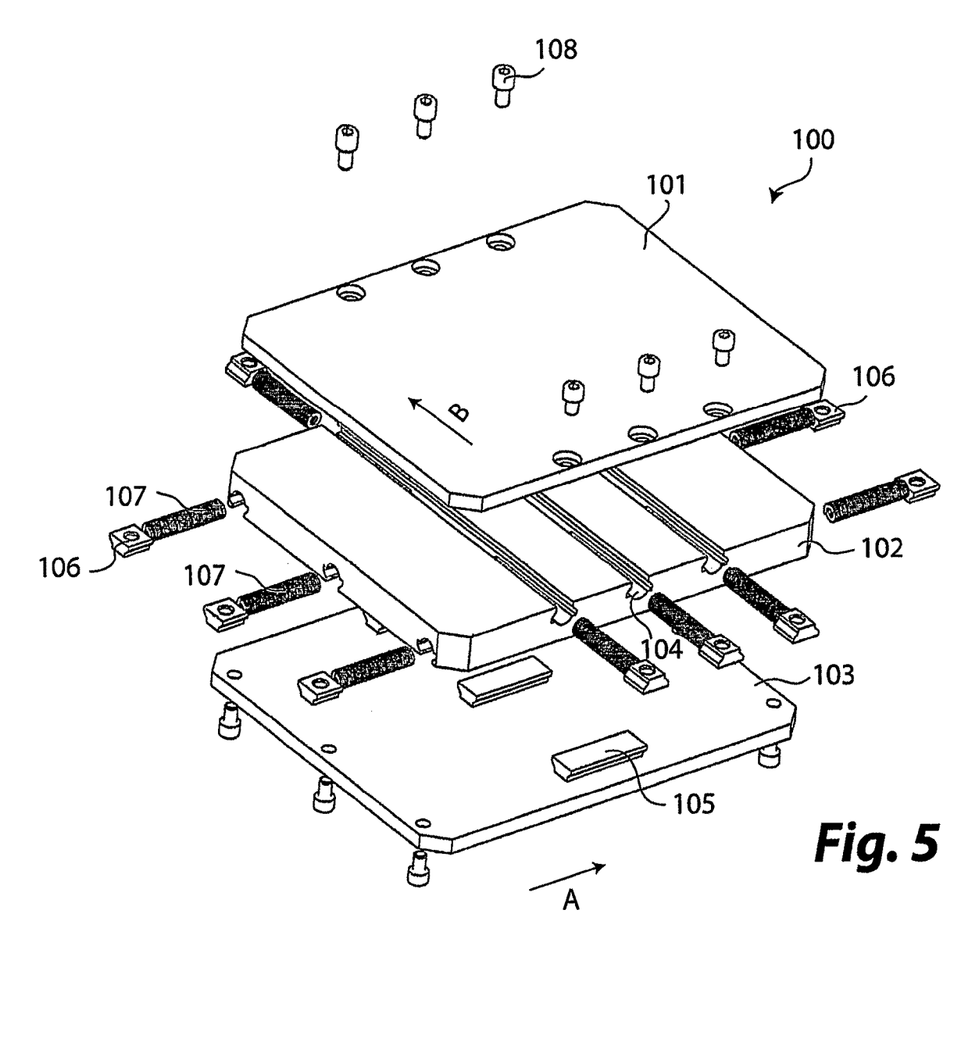
FIG. 5 is an exploded perspective view of an accessory for the electro-mechanical lifting device according to the invention.

Observing now FIG. 5, it is shown a plate, generically indicated by reference number 100, comprised of three different elements 101, 102, 103, having dove tail couplings 104, 105, permitting their sliding according to arrows A and B.

Springs 106 are inserted within the dovetail slots that, by brackets 107 and screws 108, are anchored to said plate 100. Said screws 108 further act as coupling of said plate 100 elements 101, 102, 103.

Springs 106 ensure centering of elements 101 and 103 with respect to element 102, so that they can translate longitudinally and transversely.

This system can be applied under the head 1 or under the whole structure of carriage 2 of the device according to the invention.

Figure 6A:
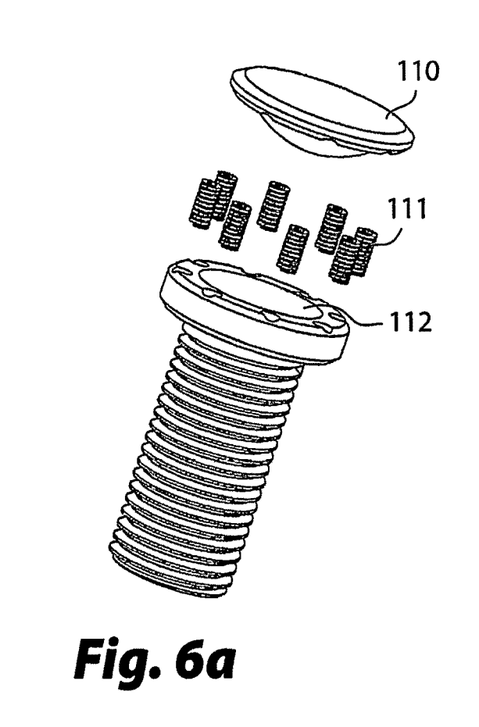
FIGS. 6a, 6b and 6c are respectively perspective, front and section exploded view, of a further accessory for the electro-mechanical lifting device according to the invention.
Figure 6B:
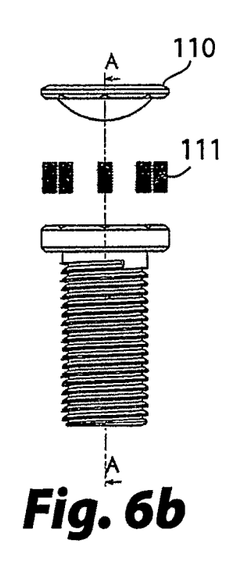
Figure 6C:
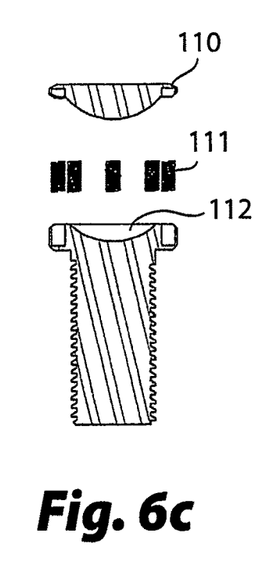
Figure 7:
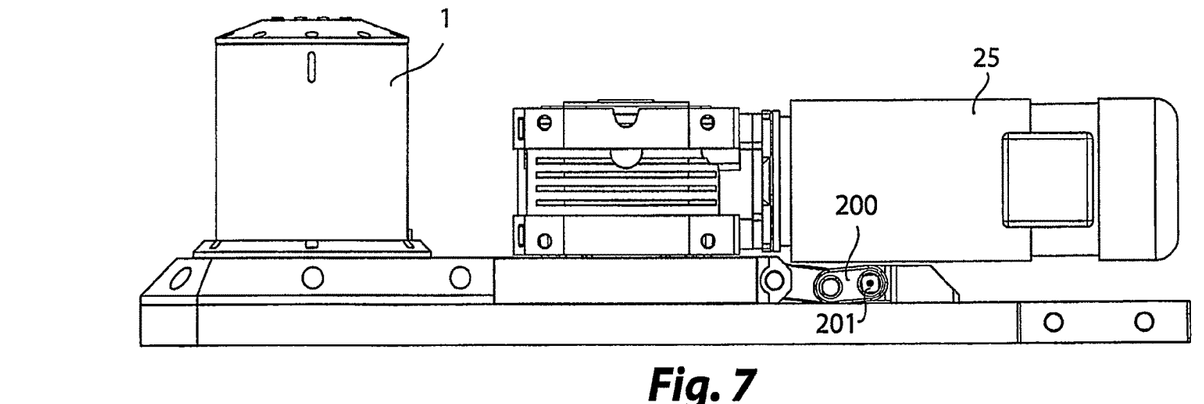
FIG. 7 is a side view of a second embodiment of the device according to the invention.
Figure 8:
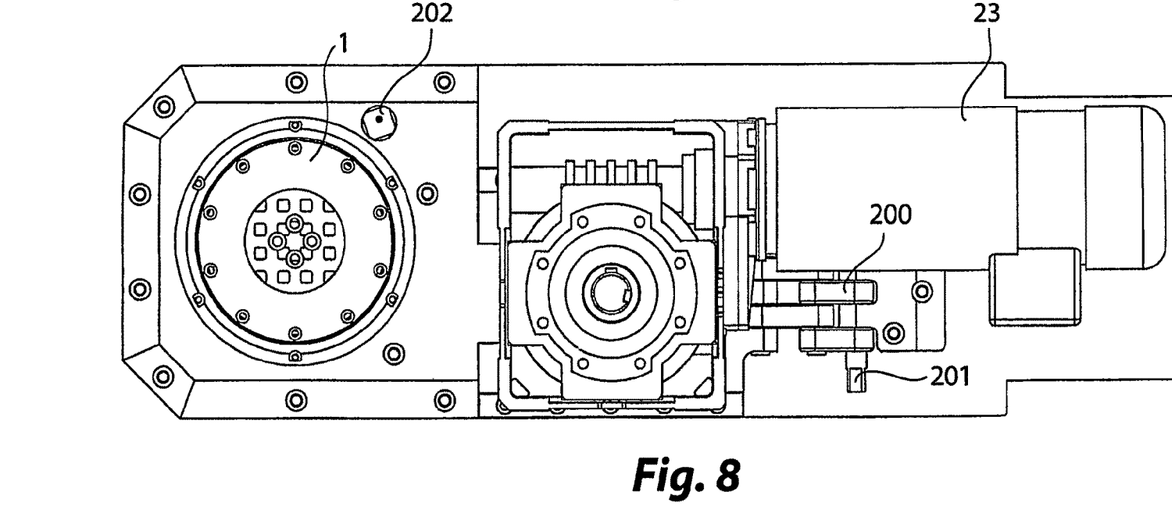
FIG. 8 is a plan view of the device of FIG. 7.
Figures 9, 10:
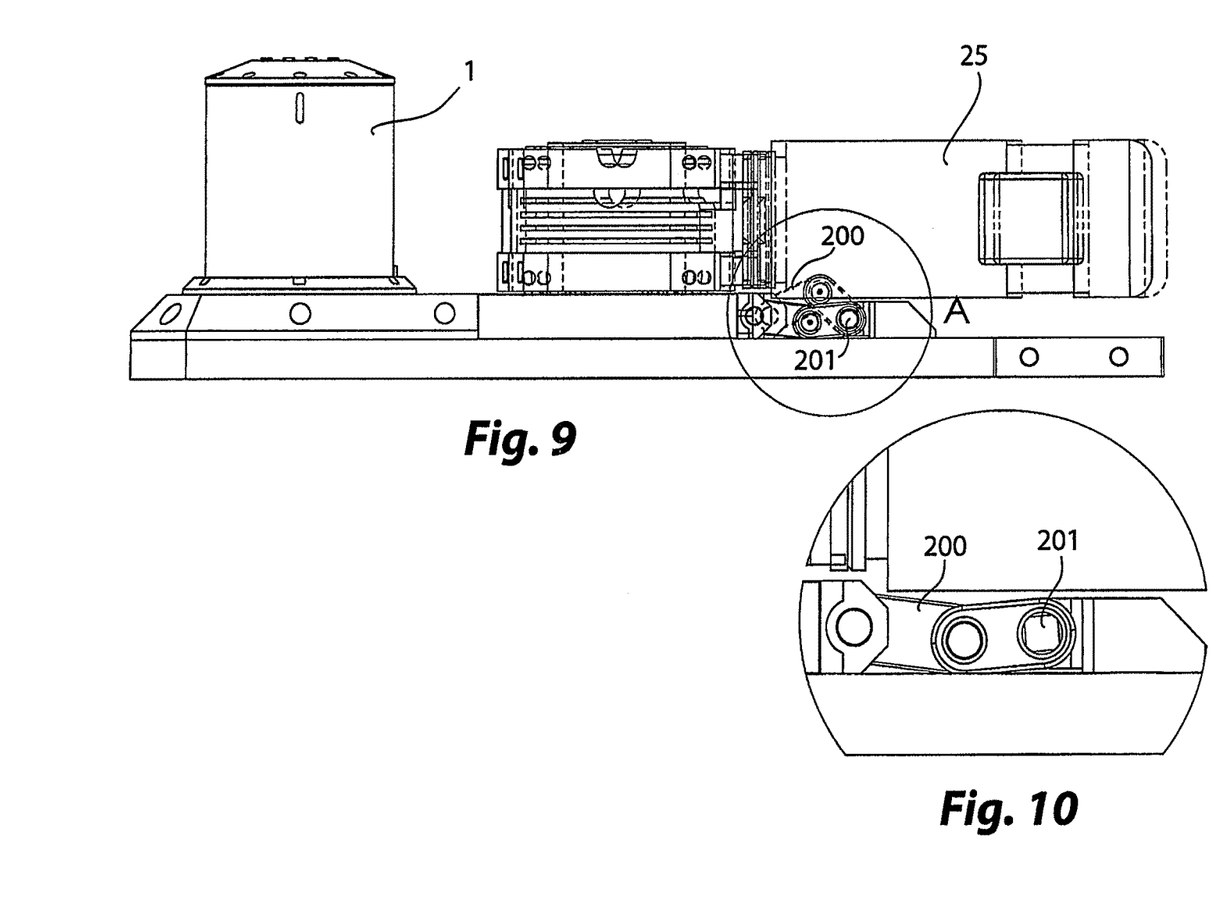
FIG. 9 is a second plan view of the device of FIG. 7.
FIG. 10 shows particular A of FIG. 9.
Figure 11:
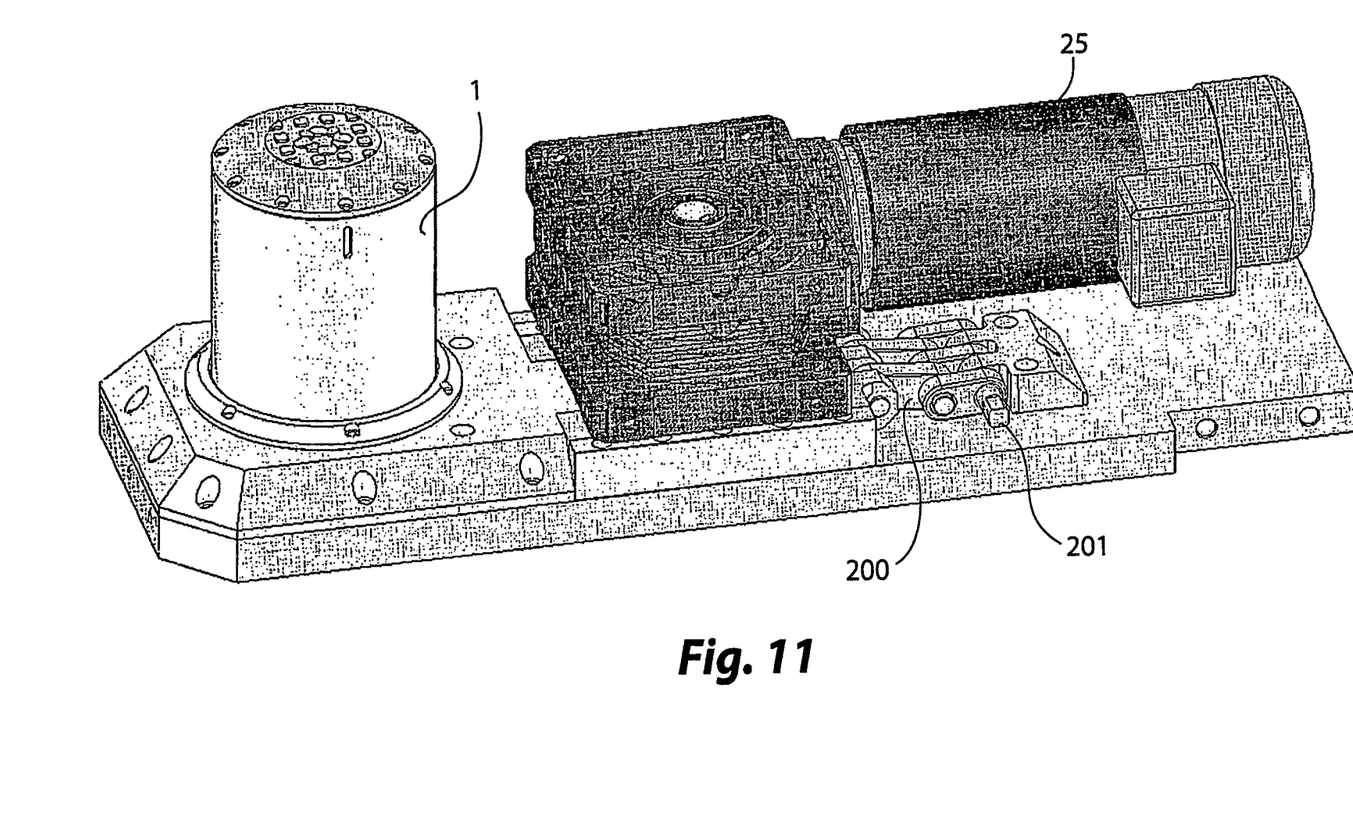
FIG. 11 is a first perspective view of the device of FIG. 7.
Figure 12:
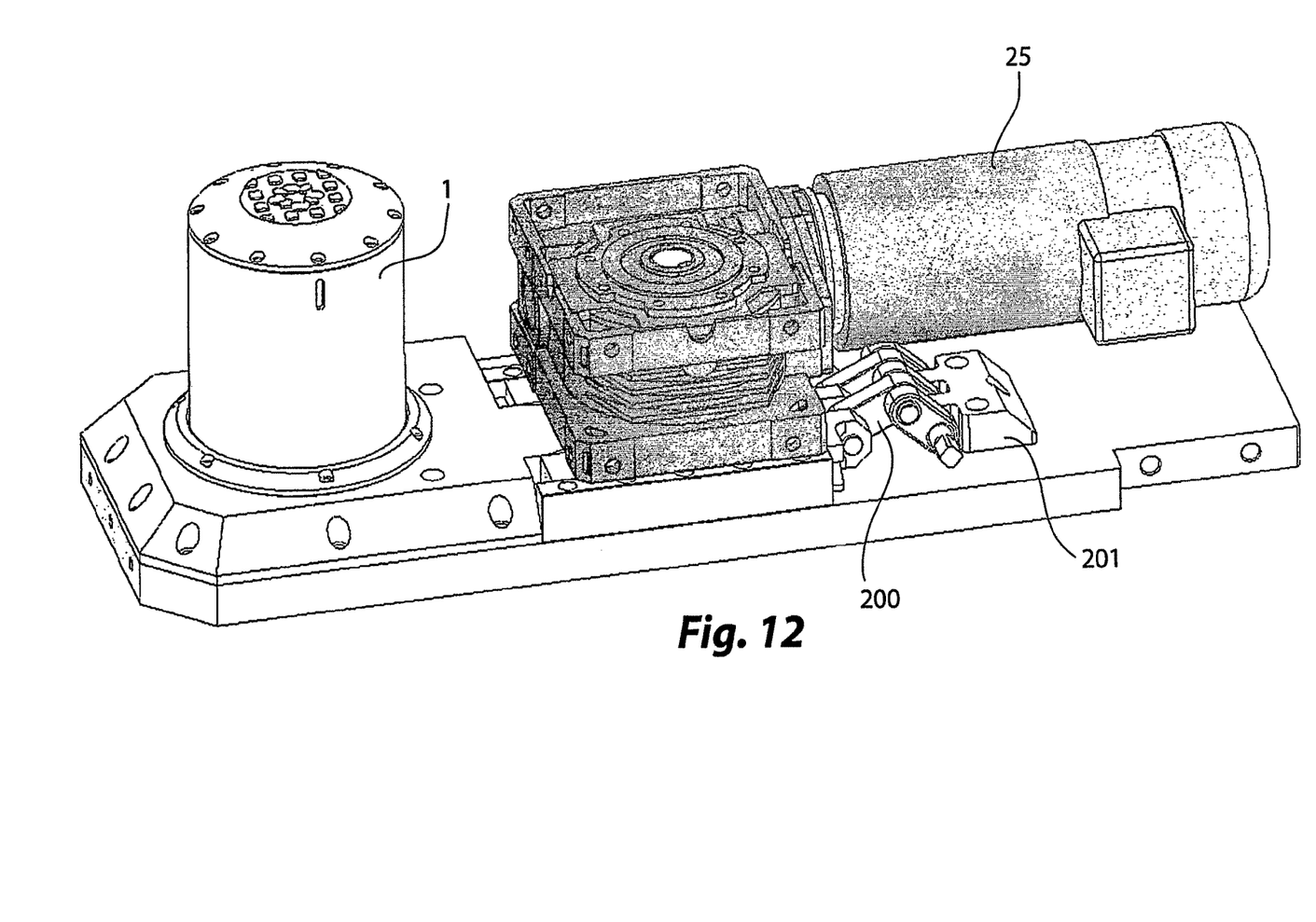
FIG. 12 is a second perspective view of the device of FIG. 7.

Coming now to observe FIG. 6, it is shown a particular embodiment of the core or first screw 9 described with reference to FIGS. 1 and 2.

In this case, it is provide a cap 110, coupled at the screw 9 by springs 111, said cap 110 being housed within a groove. This solution permits inclination of cap 110 with respect to the resting plane of every member to be lifted.

Particularly, it is provided a toggle element 200, permitting sliding of motor 25 with respect to the lifting head 1, respectively in the two positions shown in FIGS. 7, 11 and 9, 12.

In case of failure of main supply, it is sufficient acting on pin 201 to release the motor. Now, (position shown in FIGS. 9 and 12) it is possible acting on manual control 202 (by a suitable tool) in order to act on device 1, being it possible easily lowering and/or lifting under any condition.

As already mentioned, device according to the present invention can comprise an oscillating head compensating the angle of aircraft on suspensions.

Further, device can be integrated with a self-levelling system comprised of electro-mechanical feet, operating in synchronism being monitored by the electronic level provided within the lifting device.

Figure 13:
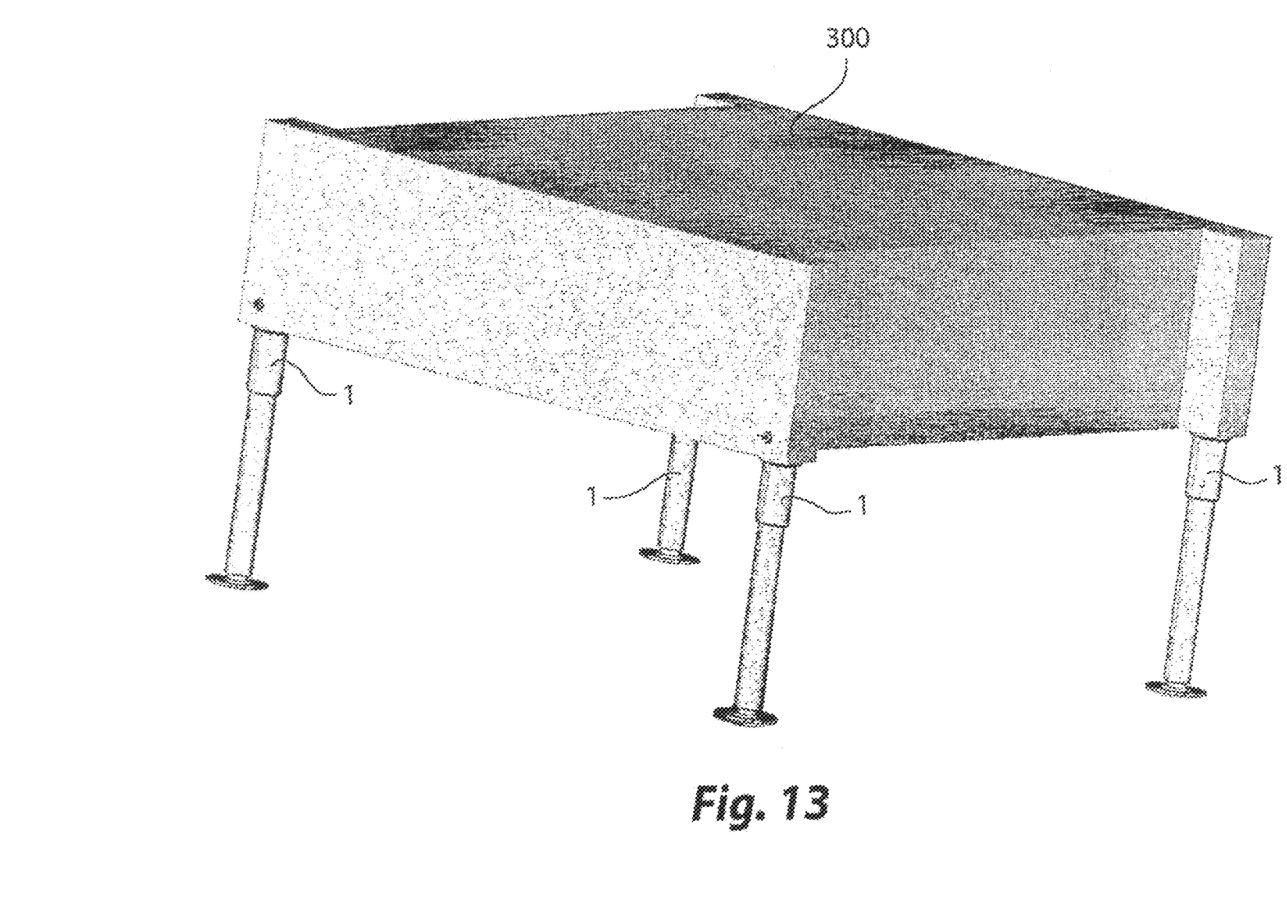
FIG. 13 is a schematic view of a further application of the lifting device according to the invention.
Figure 14:
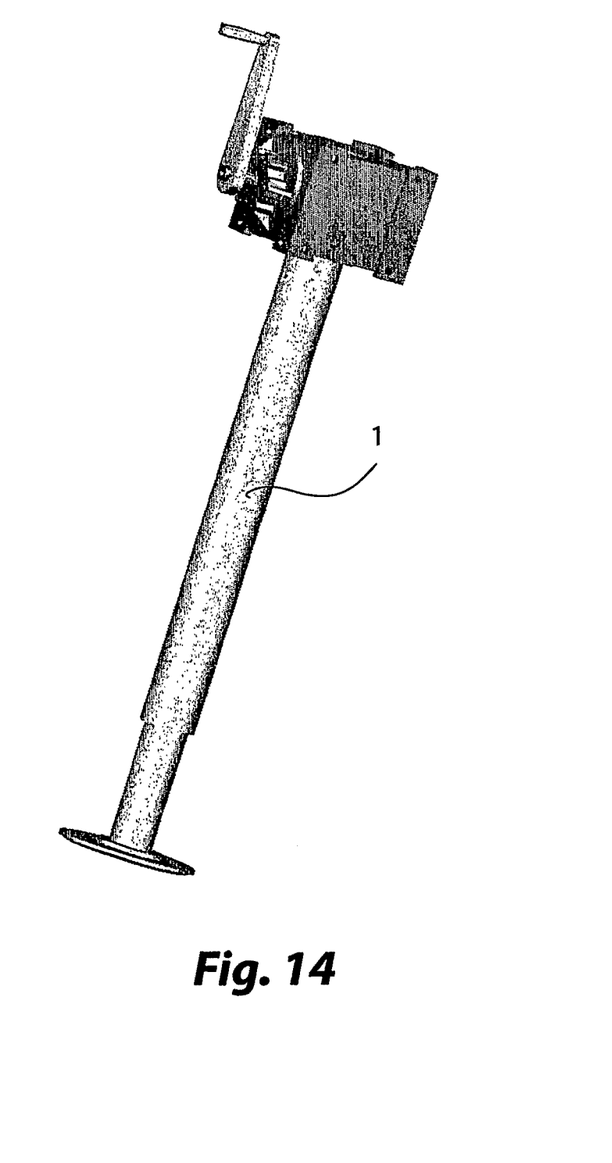
FIG. 14 shows a single lifting element for the system of FIG. 13.
Figure 15:
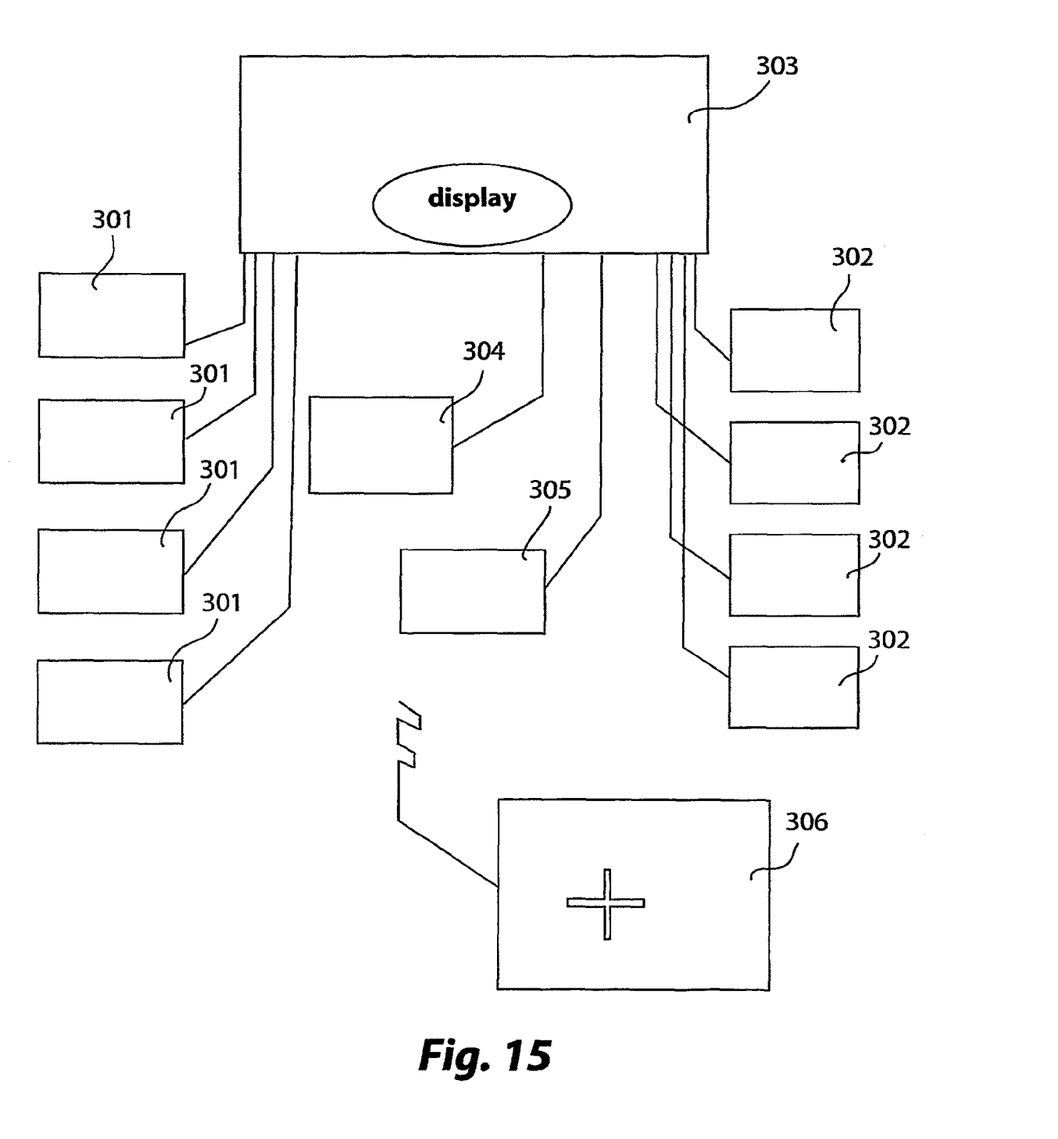
FIG. 15 is a block diagram for controlling the system of FIG. 13.

Observing now FIGS. 13-15 of the enclosed drawings, it is shown an application of the lifting device 1 according to the invention for lifting a complex element, in this case a shelter 300, but that could be every other member requiring more than 1 lifting point.

In this case, four lifting devices 1 according to the invention are applied, that could be of the manual type (see FIG. 14) or controlled by motors.

Now, a centralised control system, such as the one shown in FIG. 15, providing a motor 301 and a load cell 302 for each lifting device 1, all connected to a central control unit 303. said central unit 303 can provide inclinometers 304, along with a central control 305.

Thus, it is possible lifting shelter 300 (or other object to be lifted using more than one lifting device 1), always maintain an equilibrium among various devices 1.

Barycentre 306 visualization module can be also provided in case of manual lifting (FIG. 14).

From the previous specification, it can be noted that device according to the present invention is completely automatic, being a device that, with the aid of single operator, can make the lifting/lowering, levelling and weighting operation in the lowest time and very precisely. The whole operation can be carried out by the operator from a perfectly safe position. Further, device according to the invention can be integrated in lifting systems studied for other uses, with a failure nomenclature system, with GPS system, GSM monitoring system and automatic system for handling programmed maintenance.

Lifting device according to the invention can be integrated with xenon light or with another type of light, provided with light system permitting night working, laser aim system in order to perfectly centering the position under the aircraft.

It is further equipped with explosion-proof motors, in order to be perfectly suitable and safe for carrying out aircraft lifting and lowering operations.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. Electro-mechanical lifting device (1) comprising a lifting head (2) and a controlling and positioning carriage, said lifting head comprising a substantially vertical telescopic cylinder element (3), comprised of a first, second, third and fourth outer telescopic jacket elements (7, 6, 5, 4), and corresponding first, second, third and fourth inner telescopic threaded elements (10, 11, 8, 9), and a cap element (110) for coupling to a member to be lifted where said cap element (110) is provided above the first outer telescopic jacket element (7), characterized in that an upper end of the fourth inner telescopic threaded element (9) is coupled with said cap element (110) for the member to be lifted, the second and third inner telescopic threaded elements (11, 8) being provided with an outer threading and an inner partial threading, while the fourth inner telescopic threaded element (9) is threaded only on the outer surface, said outer telescopic jacket elements (7, 6, 5, 4) having means for preventing their mutual rotation relative to each other during actuation of said lifting device (1) by rotation of the telescopic cylinder element (3), starting from a position with the cap element (110) under said member to be lifted, and with said outer telescopic jacket elements (7, 6, 5, 4) and inner telescopic threaded elements (10, 11, 8, 9) within the fourth outer telescopic jacket element (4), said cap element (110), being fixed to said first outer telescopic jacket element (7) to prevent rotation of said fourth inner telescopic threaded element (9) during actuation which causes said fourth inner telescopic threaded element (9) to advance with respect to said third inner telescopic threaded element (8), thus causing withdrawal of said first outer telescopic jacket element (7) when said fourth inner telescopic threaded element (9) completes its stroke which causes said third inner telescopic threaded element (8) to advance with respect to said second inner telescopic threaded element (11), causing withdrawal of said third outer telescopic jacket element (5) when said third inner telescopic threaded element (8) completes its stroke which causes said second inner telescopic threaded element (11) to advance with respect to said first inner telescopic threaded element (10), causing withdrawal of said second outer telescopic jacket element (6) when said second inner telescopic threaded element (11) completes its stroke and cause the lifting device to reach a maximum extension said lifting device having a slide in for manual release of a motor, said motor being mounted on said slide, said slide being controlled by a toggle element, permitting sliding of motor with respect to the lifting head, in two positions which are respectively an engagement position and a release position, and having a manual control directly acting on the lifting device, so that said lifting device can easily be lowered and/or lifted under any condition.

2. Electro-mechanical lifting device according to claim 1, characterised in that said carriage is fixedly coupled with said lifting head (2).

3. Electro-mechanical lifting device according to claim 1, characterised in that said carriage is removably coupled with said lifting head (2).

4. Electro-mechanical lifting device according to claim 1, characterised in that said carriage provides an electric motor, a ratiomotor and gears for transmitting the motion.

5. Electro-mechanical lifting device according to claim 1, characterised in that transmission of lifting motion to said lifting head (2) occurs along a horizontal axis.

6. Electro-mechanical lifting device according to claim 1, characterised in that transmission of lifting motion to said lifting head (2) occurs along a vertical axis.

7. Electro-mechanical lifting device according to claim 1, characterised in that coupling between the member to be lifted and said upper end of the fourth inner telescopic threaded element (9) is realised by means permitting inclination of the member to be lifted.

8. Electro-mechanical lifting device according to claim 1, characterised in that load cells are provided in said lifting head (2).

9. Electro-mechanical lifting device according to claim 1, characterised in that said lifting device is integrated with xenon light or with another type of light, provided with light system permitting night working, laser aim system in order to perfectly center the member to be lifted.

10. Electro-mechanical lifting device according to claim 1, characterised in that said lifting device is realised with a drive wheel, or on a motorised carriage, comprising electric tracks and special wheels.

11. Electro-mechanical lifting device according to claim 1, characterised in that it is provided with certified explosion-proof motors.

12. Electro-mechanical lifting device according to claim 1, characterised in that interfacing between lifting devices and level is realised by cable or a proprietary open wireless technology standard for exchanging data over short distances, or radio frequency.

13. Electro-mechanical lifting device according to claim 1, characterised in that a plurality of lifting devices is provided, each one acting on a different point.

14. Electro-mechanical lifting device according to claim 13, characterised in that said lifting devices are manual lifting devices.

15. Electro-mechanical lifting device according to claim 13, characterised in that said lifting devices are controlled by motors.

16. Electro-mechanical lifting device according to claim 15, characterised in that a centralised control system is provided, said centralised control system comprising a motor and a load cell for each lifting device, all connected to a central control unit.

17. Electro-mechanical lifting device according to claim 16, characterised in that said central control unit can also provide inclinometers, along with the central control unit.

18. Electro-mechanical lifting device according to claim 1, characterised in that a barycentre visualization module is provided for each lifting device.

19. Electro-mechanical lifting device according to claim 1, characterised in that said plurality of lifting devices is interfaced with the central control unit by cable, or Wireless Fidelity (Wi-Fi), or a proprietary open wireless technology standard for exchanging data over short distances.

20. Electro-mechanical lifting device according to claim 1, characterised in that it is provided with a real time barycentre displacement system with a hand remote control to allow an operator in a shelter or aircraft or ship to switch goods, thus permitting the operator to direct the location of goods in order to maintain said shelter or aircraft or ship in balance.

\* \* \* \* \*